United States Patent
Tseng et al.

(10) Patent No.: US 8,566,328 B2
(45) Date of Patent: Oct. 22, 2013

(54) PRIORITIZATION AND UPDATING OF CONTACT INFORMATION FROM MULTIPLE SOURCES

(75) Inventors: Erick Tseng, San Francisco, CA (US); Luke Jonathan Shepard, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 318 days.

(21) Appl. No.: 12/975,201

(22) Filed: Dec. 21, 2010

(65) Prior Publication Data

US 2012/0158744 A1    Jun. 21, 2012

(51) Int. Cl.
*G06F 7/00* (2006.01)
*G06F 17/30* (2006.01)

(52) U.S. Cl.
USPC .......................................... 707/748; 707/661

(58) Field of Classification Search
None
See application file for complete search history.

(56) References Cited

U.S. PATENT DOCUMENTS

| | | | |
|---|---|---|---|
| 8,386,250 B2 * | 2/2013 | Lloyd et al. ............... | 704/244 |
| 8,386,534 B2 * | 2/2013 | Cormode et al. .......... | 707/808 |
| 8,417,696 B2 * | 4/2013 | Gupta et al. ............... | 707/729 |
| 2005/0216300 A1 * | 9/2005 | Appelman et al. ......... | 705/1 |
| 2009/0171934 A1 * | 7/2009 | Ratnakar .................... | 707/5 |
| 2009/0265198 A1 * | 10/2009 | Lester et al. ................ | 705/7 |
| 2009/0281988 A1 * | 11/2009 | Yoo ............................ | 707/3 |
| 2009/0300010 A1 * | 12/2009 | Ratnakar .................... | 707/5 |
| 2009/0307206 A1 * | 12/2009 | Morrison et al. ........... | 707/5 |
| 2009/0326995 A1 * | 12/2009 | Sorisi et al. ................ | 705/7 |
| 2010/0070528 A1 * | 3/2010 | Collins et al. .............. | 707/776 |
| 2010/0088636 A1 * | 4/2010 | Yerkes et al. ............... | 715/809 |
| 2010/0159885 A1 * | 6/2010 | Selgert et al. ........... | 455/412.1 |
| 2010/0293600 A1 * | 11/2010 | Schechter et al. .......... | 726/4 |
| 2011/0112976 A1 * | 5/2011 | Ryan et al. ................. | 705/319 |
| 2011/0271328 A1 * | 11/2011 | Sutton-Shearer ........... | 726/4 |
| 2011/0289053 A1 * | 11/2011 | Smarr et al. ................ | 707/625 |
| 2011/0307455 A1 * | 12/2011 | Gupta et al. ............... | 707/692 |
| 2012/0110006 A9 * | 5/2012 | Lubarski et al. ........... | 707/769 |
| 2012/0110096 A1 * | 5/2012 | Smarr et al. ................ | 709/206 |
| 2013/0117287 A1 * | 5/2013 | Jagota et al. ............... | 707/755 |

* cited by examiner

*Primary Examiner* — Wilson Lee
*Assistant Examiner* — Jessica N Le
(74) *Attorney, Agent, or Firm* — Fenwick & West LLP

(57) ABSTRACT

Collecting contact information for a plurality of contact entities from various sources and ranking the contact information based at least on the sources. The ranking of the contact information is determined based on the reliability of the sources. The ranked contact information is shared with users subject to privacy settings. The privacy setting allows the users or the contact entity to share certain contact information with others while keeping certain contact information privately or sharing the contact information with a limited number of users. After a change in the contact information from a reliable source is detected, the change may be propagated to other sources or client devices of the users.

24 Claims, 4 Drawing Sheets

PRIORITIZATION AND UPDATING OF CONTACT INFORMATION FROM MULTIPLE SOURCES

BACKGROUND

This invention relates to synchronizing and organizing contact information received from multiple sources.

More people are relying on electronic devices such as smartphones or computers to store and organize contact information for various contact entities (e.g., friends, family members and business contacts). However, most electronic devices still rely heavily on users' manual operations to gather and populate contact information. As the number of contacts increases, the users spend more time on the tedious task of entering and updating contact information for other users. For example, anytime the users are notified of updates in the contact information, the users are responsible for manually assessing the reliability of the updated contact information and changing the contact information in the electronic devices.

Contact information of a user can be obtained via various sources. Traditional sources of contact information include business cards, v-cards, contact importing tools, emails and webpages. Other sources of contact information include social networking services provided over the Internet. The primary function of a social networking service is to enable users to conveniently communicate with other users. To enhance such a function, the social networking service often retains contact information of the users. The contact information in the social networking service may be generated and maintained directly by a user. For example, a user or may manage his or her profile on the social networking service to allow other users to get in touch with the user. Alternatively, a user's contact information in the social networking service may be entered by someone other than the user.

The increase in the number of sources for the contact information renders managing of the contact information more time consuming and complicated because the users need to assess the reliability of contact updates, manually update entries for the contact updates and resolve any conflicts in the contact information manually. To keep the contact information current all the time, the users may need to spend an inordinate amount of time and resources.

SUMMARY

Embodiments of the invention relate to updating contact information in a plurality of sources and/or client devices based on the reliability of the contact information. The contact information is received from a plurality of sources. The reliability of the contact information is determined based at least on the sources of the contact information. Contact updates are generated and transmitted to the sources and/or client devices based on the reliability of the contact information.

In one embodiment, the contact updates are individualized for users based on privacy settings. The privacy settings indicate client devices or users authorized to share the contact information. By varying the privacy settings for contact information, certain contact information can be shared while other contact information can be kept private.

In one embodiment, the contact information is managed in a database. The database includes a plurality of tables for each user. Each table stores one or more contact information entries of the same user for the same category of contact information. Each contact information entry stores different contact information. The contact information entries are prioritized based at least on the sources of corresponding contact information.

In one embodiment, each of the table includes access information for each contact information entry. The access information indicates users authorized to access the contact information in the entry.

In one embodiment, contact revisions for updating the contact information stored in the sources are generated and sent to the sources. The contact information in the sources is updated based on the contact revisions.

In one embodiment, a user of the contact information is identified by comparing data fields in the content information with data fields in the entries of the database. A user may be determined as corresponding to an entity stored in the database if certain data fields match.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Embodiments relate to collecting contact information for users from a plurality of sources and ranking the contact information based at least on the sources. The ranking of the contact information is determined based on the reliability of the sources. The ranked contact information is shared with users according to a privacy setting assigned to the contact information. The privacy setting defines the users authorized to share contact information. After a change in the contact information from a reliable source is detected, the change may be propagated to client devices of the users and/or other sources.

The contact information described herein refers to information that enables a user to initiate communication with another user. The contact information may include, but is not limited to, phone numbers, physical addresses, email addresses, instant messenger IDs and user IDs for various Internet services (e.g., social networking services).

The user described herein refers to any entity whose contact information is of interest to other users. The user may be individuals, business entities or organizations. Some users may have accounts in social networking services.

A contact information item described herein refers to information that includes the contact information and information about users associated with the contact information. The contact information item may store, in addition to the contact information, the following: (i) names or identifications of the users, (ii) time tags indicating when the contact information item was generated, (iii) information indicating the source at which the contact information item was generated, (iv) flags/toggles indicating whether specific contact information is public or private, and (v) flags/toggles that indicate whether a local contact should be synced to a cloud server.

Overview of Contact Information Management Architecture

Figure 1:
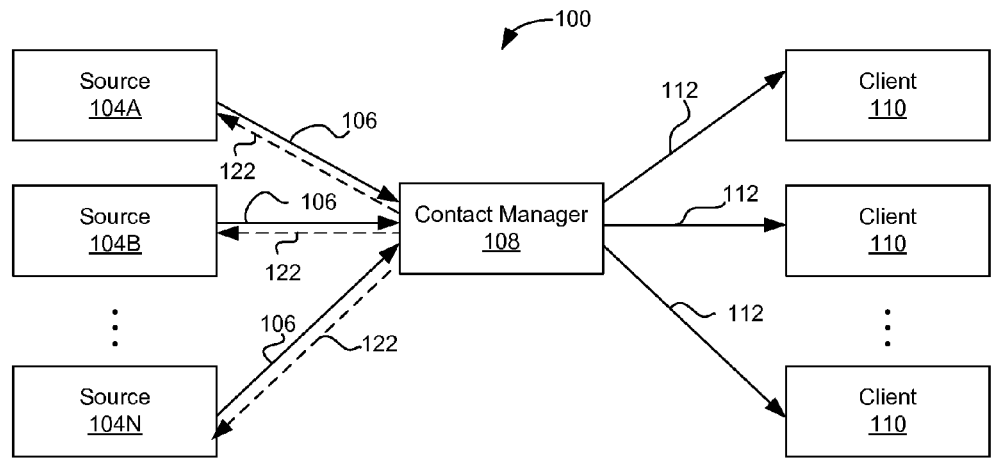
FIG. 1 is a conceptual diagram illustrating the operation of a contact manager collecting contact information items from multiple sources and propagating contact information extracted from the contact information items, according to one embodiment of the present invention.

FIG. 1 (Figure) is a conceptual diagram illustrating the operation of a contact manager collecting contact information items from multiple sources and propagating contact information extracted from the contact information items, according to one embodiment of the present invention. A contact information management system 100 enables users to collect and synchronize contact information for various users in an automated fashion with a reduced number of users' manual operations. The components of the contact information management system 100 may be geographically dispersed in various locations. Moreover, a single component (e.g., the contact manager 108) illustrated in FIG. 1 may consist of multiple hardware components that are dispersed geographically.

The contact manager 108 collects contact information items 106 from multiple sources 104A through 104N (hereinafter collectively referred to as the "sources 104"), processes the contact information item, and sends processed contact information item to multiple client devices 110, as described below in detail with reference to FIG. 2. The contact manager 108 may be part of a system or device for providing Internet services such as social networking services. Alternatively, the contact manager 108 may be a stand-alone system or device dedicated to managing contact information.

The contact information items 106 are information that the contact manager 108 receives from the sources 104. The contact information item may consist of multiple data fields including, for example, (i) name or identification of the associated user, (ii) time tag indicating when the contact information item was generated, (iii) information indicating the source at which the contact information item was generated, (iv) flags/toggles indicating whether specific contact information is public or private, and (v) flag/toggles that indicate whether a local contact should be synced to a cloud server.

The contact manager 108 communicates with sources 104 via a network or a communication bus to receive contact information items 106 from the sources 104. The contact manager 108 performs operations to generate contact updates 112 based on the received contact information items 106, and sends the contact updates 112 to the client devices 110. In one embodiment, the contact updates 112 are individualized for each of the client devices 110 based on privacy settings. The contact manager 108 may extract contact information from the contact information item and store the contact information in association with parameters for setting privacy or controlling access by other users. The contact manager 108 may also modify contact information in the sources 104 by sending contact revisions 122 to the sources 104.

The source 104 is hardware, software, firmware or a combination thereof for storing contact information. The sources 104 may include, but are not limited to, cell phones, smart phones, laptop computers, desktop computers, game consoles, set-top boxes and one or more servers. In one or more embodiments, at least one of the sources 104 is a server running social networking services, as described below in detail with reference to FIG. 4. The source 104 may perform other functions such as providing social networking services and managing users' schedules or emails.

The client device 110 is hardware, software, firmware or a combination thereof for accessing the contact information. The client devices 110 may create, update or delete information based on the received contact updates 112. In addition to the contact information generated based on contact updates 112, the client devices 110 may store their own sets of contact information independent of the contact updates 112. For example, users of the client devices 110 may enter and maintain contact information independent of and separate from the contact updates 112.

In one embodiment, the client devices 110 present contact information to the users in a manner that enables the users to distinguish whether the information was based on contact updates 112 or independently managed contact information. Further, the client devices 110 may also have capability to initiate communication based on the contact information. For example, the client devices 110 may initiate phone calls, launch email program, launch instant message programs or SMS (Short Message Service) programs based on the contact information.

Although the sources 104 and client devices 110 are described as distinct devices in FIG. 1, some sources 104 may also function as the client devices 110. The client devices 110 may be configured to store the contact information with other client devices via the contact manager 108, in which case, the client devices function also as a source 104.

Architecture of Contact Manager

Figure 2:
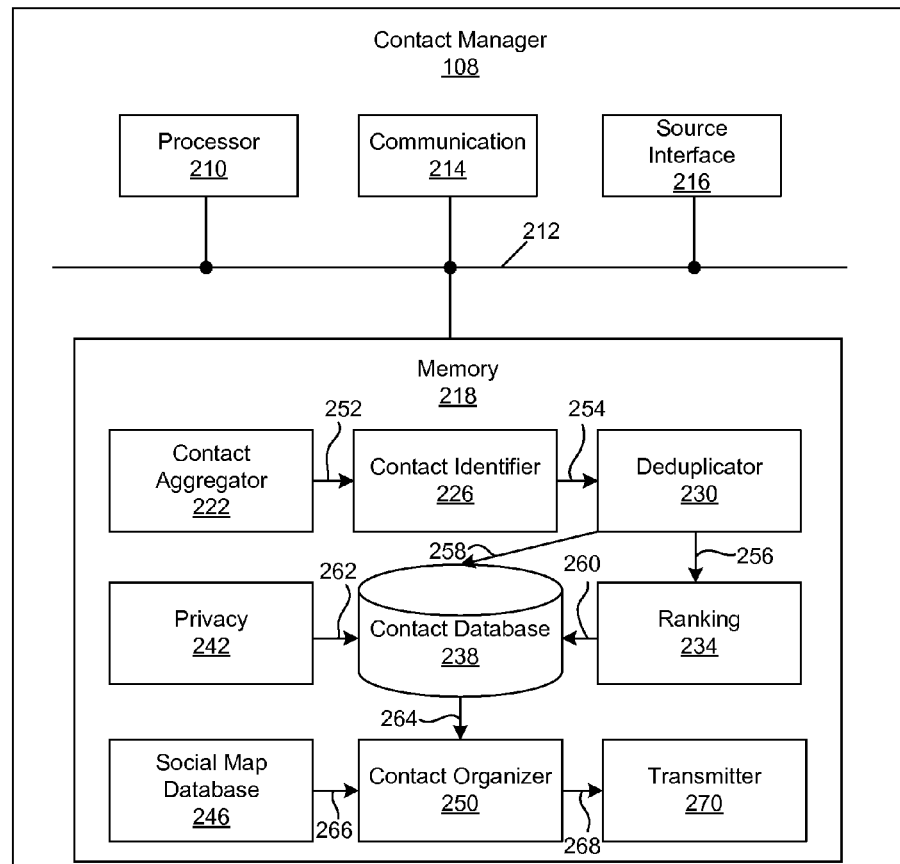
FIG. 2 is a block diagram illustrating the contact manager, according to one embodiment of the present invention.

FIG. 2 is a block diagram illustrating the contact manager 108 of FIG. 1, according to one embodiment of the present invention. The contact manager 108 may include, among other components, a processor 210, a communication module 214, memory 218 and a bus 212 connecting these components. The contact manager 108 may include other components not illustrated in FIG. 1 such as input devices or output devices.

The processor 210 is hardware that executes computer instructions stored in the memory 218. The processor 210 also issues commands to control the operation of other hardware or software components in the contact manager 108.

The communication module 214 is hardware, software, firmware or a combination thereof for communicating with the sources 104 and the client devices 110 via a network. Although only one communication module 214 is illustrated in FIG. 2, multiple communication modules may be provided in the contact manager 108 to communicate via different physical media or protocols. In one embodiment, the communication module 214 consists of a network card.

The source interface 216 is hardware, software, firmware or a combination thereof for communicating with one or more of the sources 104 via a direct connection such as a local area network (LAN). The source interface source interface 216 enables the contact manager 108 to communicate with the sources that are operating on the same machine or in the same server farm.

The memory 218 stores various modules for synchronizing and managing contact information. In one embodiment, the memory 218 stores, among other components, a contact aggregator 222, a contact identifier 226, a deduplicator 230, a ranking module 234, a contact database 238, a social map database 246, a contact organizer 250 and a transmitter 270. The memory 218 may store other modules not illustrated in FIG. 2. Further, one or more modules in the memory 218 may be divided into sub-modules or combined into a larger module.

The contact aggregator 222 communicates with the sources 104 to automatically collect the contact information items 106. The contact information items 106 may be pushed by the sources 104 to the contact aggregator 222 (i.e., the communication initiated by the sources 104) or pulled by the contact aggregator 222 from the sources 104 (i.e., the communication initiated by the contact aggregator 222). For this purpose, the contact aggregator 222 may execute various communication protocols or algorithms. For example, the contact aggregator 222 deploys agents in the sources 104 to retrieve the contact information items 106 or periodically log onto the sources 104 to collect the contact information items 106. The contact aggregator 222 also normalizes the contact information items 106 and sends the normalized contact information items 252 to the contact identifier 226.

The contact identifier 226 analyzes the normalized contact information item 252 to determine if the contact database 238 already stores a record associated with the normalized contact information item 252. In one embodiment, the contact identifier 226 compares data fields in the normalized contact information item 252 with data fields of entries in the contact database 238 to determine if the record associated with the normalized contact information item 252 matches any of the records in the contact database 238. For example, the contact identifier 226 may determine that the user of the normalized contact information item 252 relates to the same user in the contact database 238 if some or all of data fields match. Data fields for such comparison may include, but are not limited to, (i) first name, (ii) last name, (iii) phone numbers, (iv) email addresses, (v) physical addresses, (vi) social networking aliases and (vii) chat aliases. In one embodiment, the contact identifier 226 determines that the user of the normalized contact information item 252 is the same user in a record of the contact database 238 if a threshold number of data fields match.

The contact identifier 226 may also consider other information available from social networking services such as (i) demographic information, (ii) a social map representing relationships between users in a social networking service, (iii) credit card information, (iv) directory services (e.g., Internet whitepage service) and (v) locations of the entities to determine if the entity in the contact database 238 matches the entity in the normalized contact information item 252. In one embodiment, the contact identifier 226 employs a scoring algorithm that tallies scores for matching data fields and determining that a user in the normalized contact information item 252 and the contact database 238 match if the total score exceeds a threshold.

After identifying the matching record, contact ID information 254 is sent to the deduplicator 230. The contact ID information 254 includes both the identity of the user and the normalized contact information.

Despite differences in the format, the data fields in the contact ID information 254 and the data fields in the contact database 238 may indicate the same contact information. For example, a phone number 777-777-7777 may be the same phone number as 777.7777.7777 or +1-777-7777-7777 (where "+1" represents a nation code). The deduplicator 230 applies a set of rules to determine if any of the contact information in the contact ID information 254 is in fact the same contact information in the contact database 238. After performing the deduplication process, the deduplicator 230 sends update instructions 258 to the contact database 238 to update data in the contact database 238, as described below in detail with reference to FIG. 3. Further, the deduplicator 230 sends update status information 256 to the ranking module 234 to prompt the ranking module to start the process of updating the "priority" in the contact information of the user, as described below in detail with reference to FIG. 3.

The ranking module 234 prioritizes the contact information based on the source of the contact information. The reliability of the contact information may depend on the source of the contact information. As a general rule, the contact information of a user is more reliable if the contact information originated from a source that is managed and updated by the user. For example, the contact information of a person from the person's profile in a web service (e.g., a social networking service) or the person's own smartphone is more likely to be accurate compared to the contact information generated and updated by another party. The ranking module 234 assigns and stores the reliability of each of the sources. Based on the reliability scores of the sources, the ranking module 234 prioritizes the contact information.

The ranking module 234 may also adopt other rules for prioritizing the contact information. Such a prioritization scheme may include, for example, the following: (i) recent contact information is more likely to be accurate compared to stale contact information, (ii) the contact information is more likely to be accurate if multiple sources indicate the same contact information, and (iii) contact information provided by a person closer to the user is more likely to be accurate compared to contact information provided by a person having no relationship or a limited relationship with the user. The closeness of the user to a person may be determined based on a social map database 246 available from a social networking service. After prioritizing the contact information, the ranking module 234 updates entries in the contact database 238 to indicate the relative reliability of contact information.

The contact database 238 stores contact information collected from the sources 104. The contact database 238 may generate, create or delete entries based on information from the deduplicator 230 or other components in the memory 218. An example data structure of contact information (as stored in the contact database 238) is described below in detail with reference to FIG. 3.

The privacy module 242 allows the users to set the contact information private or public, and the extent to which the contact information is to be shared if set to public. In one embodiment, the privacy module 242 receives inputs from the users, and then issues privacy setting commands 262 to modify the "access" field for contact information in the contact database 238, as described below in detail with reference to FIG. 3. The privacy module 242 may restrict sharing of certain types of contact information to certain types or categories of users while prohibiting sharing of some contact information. Based on the privacy setting, different users may be given access to different sets of contact information.

The social map database 246 stores a social map representing the relationships between users of a social networking service. The social map indicates the closeness of the users and which users are more likely to interact with each other. The social map may be used by the ranking module 234 for ranking the contact information. The social map may also be used by the contact organizer 250 to organize the contact information based on the relationships between the users.

The contact organizer 250 receives contact data 264 from the social information 266 to organize the contact information. In one embodiment, instead of presenting a list of users in an alphabetical order, the contact organizer 250 organizes the list of users based on the closeness of the users. The contact organizer 250 may also select the most reliable contact information for a type of communication media to which a user is granted access. The contact organizer 250 compiles a contact information list 268 individualized for each user and sends the contact information list 268 to the transmitter 270.

The transmitter 270 sends the contact information list 268 to the client devices 110 and/or the sources 104 via the communication module 214. In one embodiment, the transmitter 270 generates a webpage including the contact information list 268 that may be accessed by the client devices 110 via an Internet browser. Alternatively, the transmitter 270 may operate in conjunction with an address management application launched and executed on the client devices 110. When updating the contact information in the sources 104, the transmitter 270 may take into account the reliability of the sources. For example, the transmitter 270 only sends the contact revisions 122 to the sources 104 that are deemed to be less reliable than the source of the contact information item 106 that prompted the modification of the contact information in the contact database 238.

Example Data Structure of Contact Information

Figure 3:
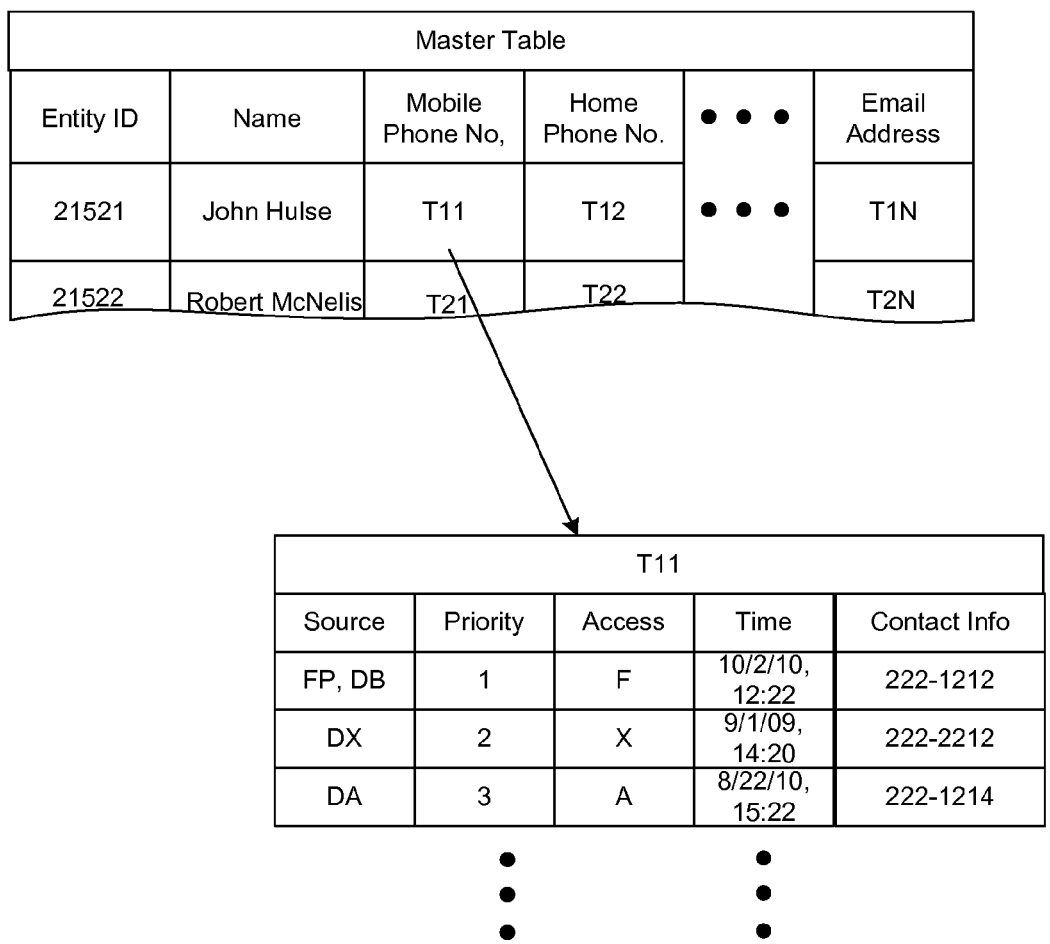
FIG. 3 is a diagram illustrating the data structure of contact information as stored in the contact manager, according to one embodiment of the present invention.

FIG. 3 is a diagram illustrating the data structure of contact information as stored in the contact manager 108, according to one embodiment of the present invention. The data structure includes a master table and sub-tables associated with each entry of the master table. For each entity, a row of the master table stores an entity identity (ID) number that uniquely identifies the entity. In FIG. 3, two entities are listed, one entity having the entity ID of 21521 and the other entity having the entity ID of 21522. Entity ID 21521 indicates a user having the name of "John Hulse" and entity ID 21522 indicates a user having the name of "Robert McNelis." Although only two user IDs are listed in the example of FIG. 3, the contact database 238 may include millions or tens of millions of entity IDs in practice.

Each entity may be associated with one or more sub-tables that include information for a certain category of contact information. Each entry in the master table may be associated with a sub-table by, for example, a pointer referencing the sub-table. In the example of FIG. 3, John Hulse is associated with sub-tables T11 through T1N and Robert McNelis is associated with sub-tables T21 through T2N. Sub-tables T11 and T21 store information about the mobile phone numbers, T12 and T22 store information about home phone numbers, and T1N and T2N store information about email addresses, respectively.

Each sub-table includes one or more rows of contact data for the corresponding category of contact information. In one embodiment, each sub-table includes the following fields: (i) source, (ii) priority, (iii) access rights, (iv) time and (v) contact information as illustrated in sub-table T11 of FIG. 3. The "source" field indicates where the contact information originated. In the example of FIG. 3, "FP" indicates that the source of the contact information was a user profile of the entity in a social networking service (e.g., Facebook). "DB," "DX" and "DA" indicate that the source of the contact information was user B's device, user X's device and user A's device, respectively. The "source" field can include multiple sources of the data entries. For example, the source for data entry "222-1212" is indicated as both "FP" and "DB." The source of the data entries may be one of the factors for determining the reliability or ranking of each data entry.

The "priority" field indicates the ranking of the contact information as determined by the ranking module 234. Higher ranked contact information is more reliable than lower ranked contact information. In the example of FIG. 3, the contact information of "222-1212" has the highest rank and is regarded as the most reliable contact information.

The "access" field indicates the users having access to the data entry. Various types of privacy schemes may be adopted by the contact manager 108 to limit access to the contact information. In one embodiment, the privacy setting of an associated social network service is copied and implemented on the contact manager 108. In one embodiment, the access right for each category of contact information can be set differently. In the example of FIG. 3, "F" indicates that all "friends" of the user have access to the data entry of "222-1212," "X" indicates that only user X has access to the data entry of "222-2212" and "A" indicates that only user A has access to the data entry of "222-1 214." The "access" field can be set to make certain contact information public while keeping other contact information private.

The "time" field indicates the previous time when the data entry was updated. If there are more than two sources indicating different update times of contact information, the more recent time is stored in this field. The "time" field may be used to distinguish between stale contact information and new contact information.

The "contact information" field stores the contact information corresponding to the row. In one embodiment, the contact information stored in this field is normalized by the contact aggregator 222.

When the new contact information of an entity is received at the contact manager 108, the contact manager 108 determines if a row for the entity is already available in the master table. If no row is available in the master table, a new row is created in the master table to store information associated with the entity. Then, one or more sub-tables are initialized to store information on the contact information of the new entity.

If the row for the entity is already available in the master table, the contact manager 108 adds the new contact information into the sub-table corresponding to the category of the new contact information. If the newly received contact information overlaps with previous contact information stored in the sub-table, the "source" field, the "access" field, and the "time" field may be updated to reflect that contact information available from another source. If the ranking module 234 determines that the ranking of the contact information has also changed as a result of the update to the contact information, then the "priority" field is also updated.

Various data structures other than the data structure illustrated in FIG. 3 may be used. In one embodiment, a separate master table is created for each user instead of maintaining a single master table of an entity for multiple users. Any contact information in the separate master table and the associated sub-tables can be accessed by an assigned user. In this embodiment, the "access" field may be omitted since all the contact information in the user's master table or sub-tables associated with the user's master table may be set to allow access by a corresponding user.

Example Architecture of Source

Figure 4:
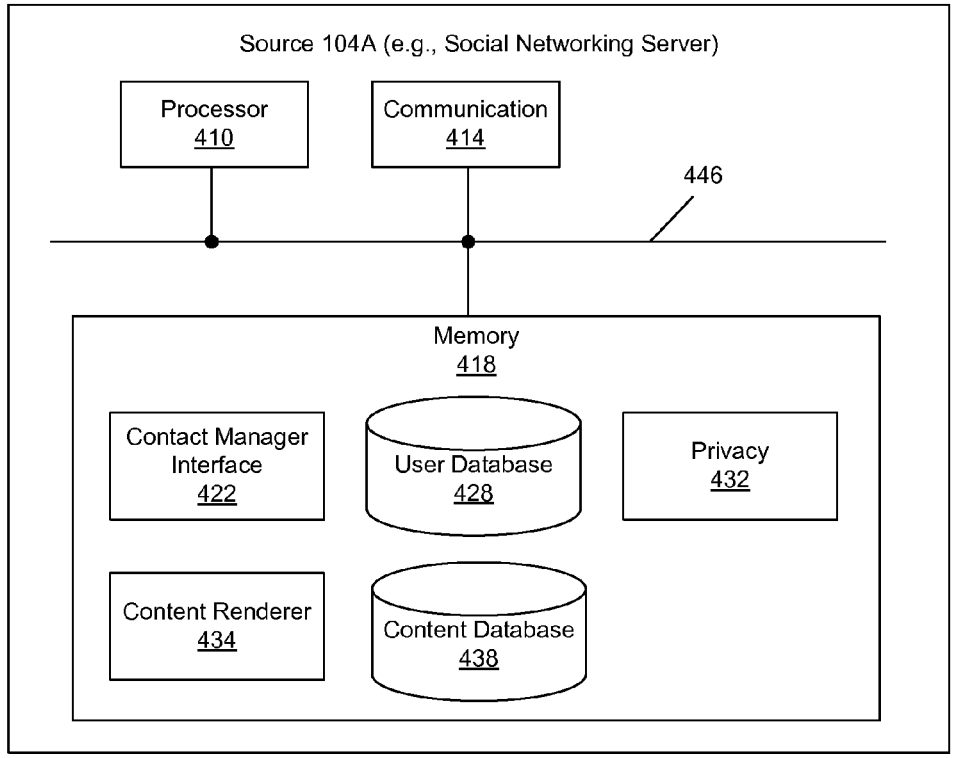
FIG. 4 is a block diagram of a source of contact information, according to one embodiment of the present invention.

FIG. 4 is a block diagram of a source 104A of contact information, according to one embodiment of the present invention. The source 104A in FIG. 4 is a server for providing social networking services to multiple users. The social networking services allow users to establish relationships with other users and communicate various media items or status updates to the other users. The users of the social networking service may maintain their user profiles or contact information of the related users in the social networking service. Such user profiles or contact information may be stored in the source 104A and made available to the contact manager 108.

In one embodiment, the source 104A may include, among other components, a processor 410, a communication module 414, a memory 418 and a bus 446 connecting these components. The processor 410 is a hardware component for executing commands in the memory 418. The communication module 414 is hardware, firmware, software or a combination thereof for communicating with users and the contact manager 108. In one embodiment, the communication module 414 is a network card that communicates data via Internet or other networks.

The memory 418 is a computer readable storage medium storing, among other modules, a contact manager interface 422, a user database 428, a privacy module 432, a content renderer 434, and a content database 438. The contact manager interface 422 enables communication with the contact manager 108 to collect and send the contact information item 106 to the contact manager 108 as well as receive the contact revisions 122. In one embodiment, the contact manager interface 422 includes an agent program that collects the contact information from the user database 428 and format the collected contact information for transmittal to the contact manager 108.

The user database 428 stores the users' information. The information stored in the user database 428 may include, for example, the user profiles, contact information managed by the users, authentication information for accessing the social networking service, and relationships to other users. The user profiles may include, among other information, the contact information of the users.

The privacy module 432 controls access to the information in the user database 428 and the content database 438 to the users of the social networking service. The privacy module 432 may indicate, among others, which content items in the content database 438 and the user profiles in the user database 428 should be made available to which users as well as the level of details to be made available to the user.

The content database 438 stores various content items for presentation to the users of the social networking service. The content items may include, among others, movie clips, images, strings of characters, status updates and executables. The content items may be uploaded by the users for sharing with other users.

In one embodiment, the content renderer 434 retrieves the content items from the content database 438, processes the content items into a page of information for presentation to the users in the form of newsfeed as described, for example, in U.S. patent application Ser. No. 11/503,242, entitled "Dynamically Providing a News Feed about a User of a Social Network," filed on Aug. 11, 2006 (now issued as U.S. Pat. No. 7,669,123); and U.S. patent application Ser. No. 12/574,614 entitled "Sharing of Location-Based Content Item In Social Networking Services," filed on Oct. 6, 2009, which are incorporated by reference herein in their entirety.

The source 104A is merely an example of a source providing contact information to the contact manager 108. Other sources may include servers providing contact information directory services such as phone directory services and user's computing devices (e.g., smartphones).

Example Architecture of Source

Figure 5:
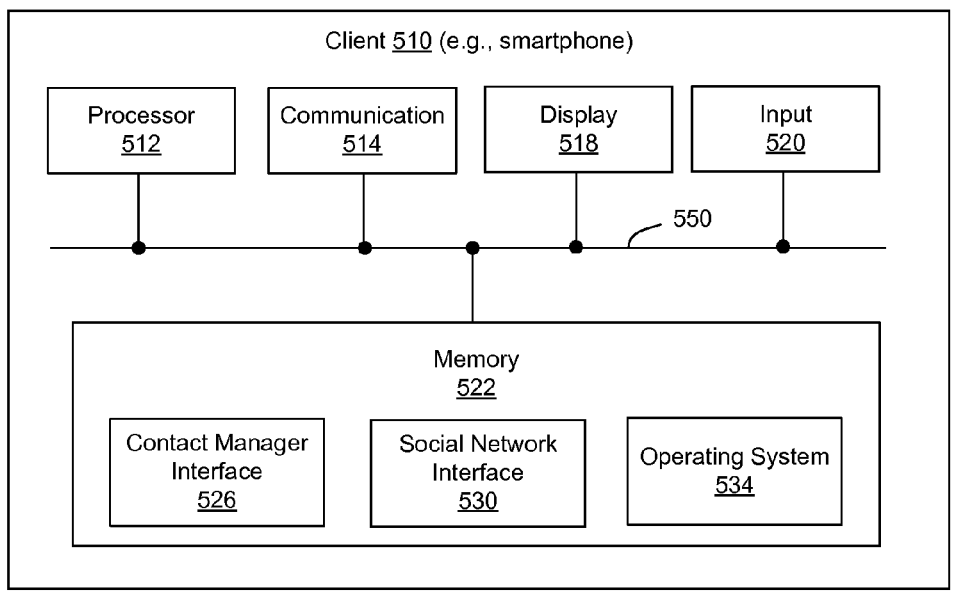
FIG. 5 is a block diagram of a client device receiving the contact information from the contact manager, according to one embodiment of the present invention.

FIG. 5 is a block diagram of a client device 510 according to one embodiment of the present invention. In the example of FIG. 5, the client device 510 is a portable smartphone with mobile communication capabilities. The client device 510 may include, among other components, a processor 512, a communication module 514, a display module 518, an input module 520, memory 522 and a bus 550 connecting these components. The client device 510 may include other components such as interface devices (e.g., memory card interfaces) or output devices (e.g., speaker) that are not illustrated in FIG. 5.

The processor 512 is a hardware component for reading instructions from the memory 522 and executing the instructions. Although only one processor is illustrated in FIG. 5, the client device 510 may include multiple processors dedicated for different functions.

The communication module 514 is hardware, firmware, software or a combination thereof for communicating with other devices. The communication module 514 may include multiple sub-modules dedicated for communicating via different channels. For example, the communication module 514 may include a sub-module for long-range wireless communication (e.g., cellular phone network) and a sub-module for short-range wireless communication (e.g., Bluetooth). The communication module 514 includes at least one sub-module for receiving the contact updates 112 from the contact manager 108.

The display module 518 is hardware, firmware, software or a combination thereof for displaying user interface elements associated with the operation of the client device 510. The display module 518 may be embodied using various display devices such as LCD (Liquid Crystal Display) or LED (Light Emitting Diode).

The input module 520 is hardware, firmware, software or a combination thereof for receiving user inputs. The input module 520 may include, for example, a touchscreen, a keypad, switches and buttons.

The memory 522 is a computer readable storage medium for storing computer instructions and data. In one embodiment, the memory 522 stores, among other modules, a contact manager interface 526, a social network interface 530 and an operating system 534. The contact manager interface 526 enables the client device 510 to communicate with the contact manager 108 to receive the contact updates 112. In one embodiment, the contact updates 112 is organized according to the closeness of relationships between the user of the client device 510 and users, as described above in detail with reference to FIG. 2. The client device 510 has at least one mode of presentation where the contact information is prioritized based on the closeness of the users. By presenting the contact information in this manner, the user of the client device 510 can conveniently search and locate the contact information of other closely related users.

The social network interface 530 allows the users to communicate with the social networking server (for example, the source 104A of FIG. 4) and perform various operations such as viewing the user profiles, the contact information and content items available on the social networking service. The social network interface 530 may be embodied, for example, as an Internet browser.

The operating system 534 manages the resources of the client device 510. The operating system 534 is, for example, iOS (from Apple, of Cupertino, Calif.), Android (from Google Inc. of Mountain View, Calif.), Blackberry OS (from Research In Motion of Waterloo, Ontario, Canada) or Web OS (from Palm, Inc. of Sunnyvale, Calif.).

Although the client device 510 is described above as performing the primary role of a client device, the client device 510 may also function as a source of the contact information. When functioning as the source of contact information, the contact manager interface 526 collects contact information in the client device 510 and sends the contact information item 106 to the contact manager 108.

Structure of Example Online Service System

Figure 6:
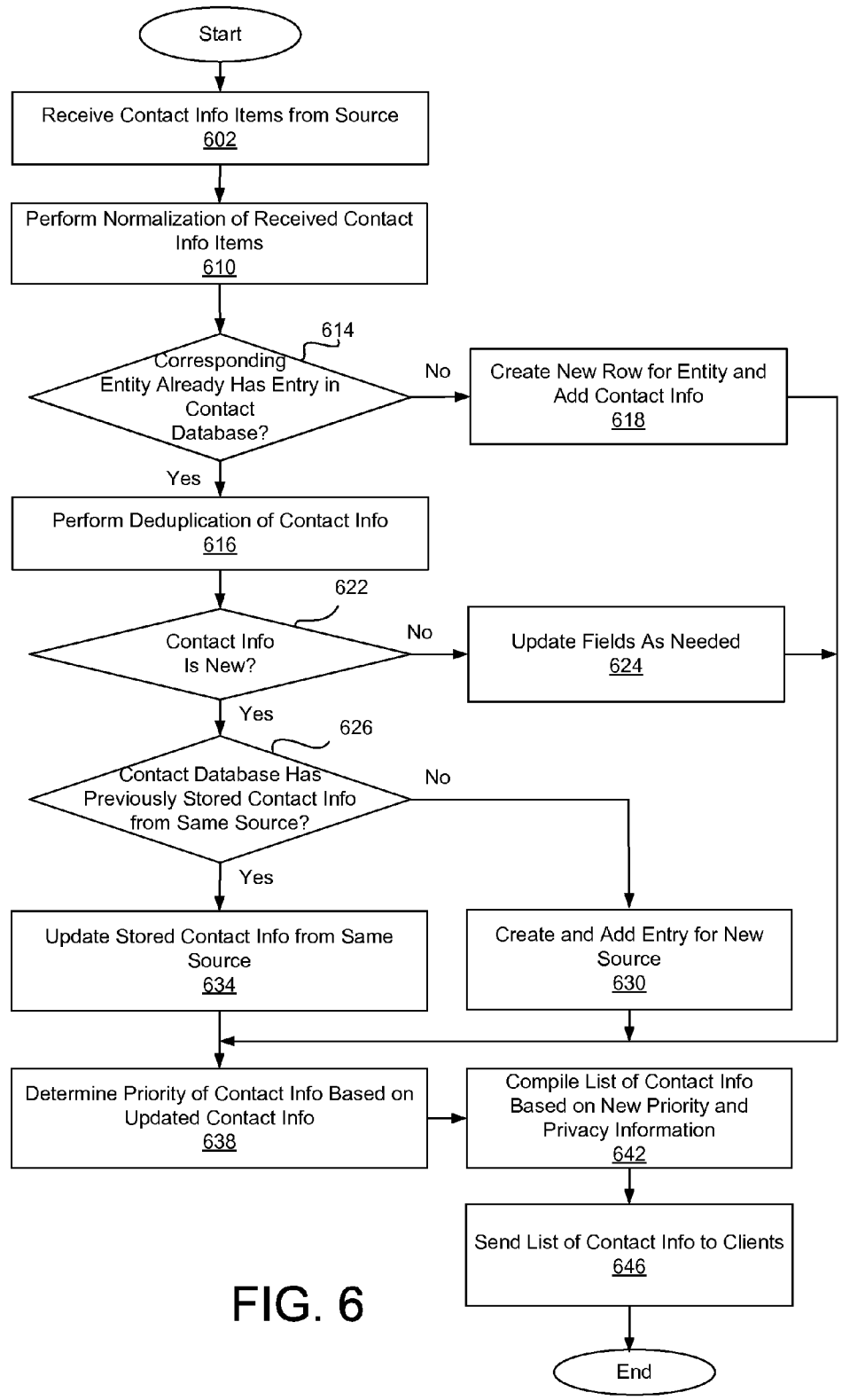
FIG. 6 is a flowchart illustrating a method of processing received contact information items, according to one embodiment.

FIG. 6 is a flowchart illustrating a method of processing received contact information at the contact manager 108, according to one embodiment. The contact aggregator 222 of the contact manager 108 receives 602 the contact information items 106 from the sources 104. The contact aggregator 222 then performs 610 normalization on the contact information items 106 to generate the normalized contact information items 252. The contact identifier 226 then determines 614 if the usery associated with a normalized contact information item 252 already has a record in the main table stored in the contact database 238. The presence of the corresponding record is determined, for example, by matching one or more fields of the contact information with the fields of entries for entities in the contact database 238.

If the contact identifier 226 determines that there is no row in the main table associated with the user of the normalized contact information transmitter 270, a new record row is created 618 in the main table of the contact database 238. Also, the contact information is added in sub-tables associated with the newly created row. Then the process proceeds to determine 638 the priority of contact information.

If the contact identifier 226 determines that there is already a record row in the main table associated with the user of the normalized contact information item 252, then the deduplicator 230 performs 616 deduplication to match the format of the received contact information with the format of the contact information already stored in the contact database 238.

After performing 610 the deduplication process, the deduplicator 230 determines 622 if the received contact information is new contact information or old contact information already stored in the contact database 238. If it is determined that the contact information is not new, then the process proceeds to update 624 fields of the sub-tables associated with the user. Specifically, one or more of the "source" field, the "priority" field, the "access" field and the "time" field of the contact information is updated based on the received contact information. Then the process proceeds to determine 638 priority of contact information based on the updated contact information.

If the deduplicator 230 determines that the contact information is new, then the deduplicator 230 further determines 626 if the contact database 238 stores contact information from the same source. If the contact database 238 already stores the contact information from the same source, then the deduplicator 230 updates 634 the currently stored contact information with the received contact information. The "time" field of the contact information is also updated to indicate the time when the contact information was updated.

If the contact database 238 does not store any contact information from the same source, then the deduplicator 230 creates 630 an entry for the new source in the sub-table of the corresponding category of contact information.

The ranking module 234 determines 638 the priority of the contact information in the same sub-table after updating 634 the contact information, creating 630 the entry in the sub-table, or updating 624 the fields. As described above in detail with reference to FIG. 2, the ranking module 234 determines the priority of the contact information based on, for example, the reliability of the sources of the contact information, the number of sources indicating the same contact information, and the update time of the contact information.

After determining the priority of the contact information, the contact organizer 250 compiles and organizes 642 a list of contact information based on the updated priority and the privacy information. Specifically, the contact organizer 250 organizes a list of users individually prioritized for each of the users of the client devices 110 based on the relationship between the users described in the social map database 246. The users having close relationships with a user are placed higher on the list for the user whereas users with insignificant relationships are placed lower on the list. Further, the contact organizer 250 lists the contact information for each category of contact information based on the priority of the contact information. In one embodiment, the contact organizer 250 selects only the highest ranked contact information for each category of contact information while discarding the lower ranked contact information from the list of contact information.

Then the transmitter 270 sends 646 the list of contact information to the client devices 110 via the communication module 214. The transmitter 270 may also send the contact revisions 122 to the sources 104 to update the contact information stored in the sources 104.

The sequence of steps and the process described above with reference to FIG. 6 are merely illustrative. For example, deduplicating 616 of the contact information may be performed before determining 626 whether the contact database has previously stored contact information from the same source. Further, some processes may be omitted. For example, compiling 642 a list of contact information may be omitted. Instead, the new contact information and updated priority may be sent to the client devices 110.

In one embodiment, the contact manager 108 synchronizes the contact manager 108 of the same user to store the same contact information. For this purpose, the contact manager 108 may store information about the client devices 110 of the same user. After receiving updated contact information, the contact manager 108 sends the same list of contact information to all the client devices 110 of the same user to update the contact information.

In one embodiment, the client devices 110 may be configured to display the source of the contact information. For example, a blue dot displayed next to the contact information may indicate that the contact information originated from a social networking service while a red dot displayed next to the contact information may indicate that the contact information was manually entered by the user.

It is to be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable storage medium. Suitable computer-readable storage medium may include, among others, volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method comprising:
    receiving contact information for a plurality of users from a plurality of sources;
    by a computing device, determining reliability of the received contact information based on sources of the received contact information, the reliability indicating likelihood that the received contact information is accurate;

storing the received contact information of each user in connection with a source of the received contact information in a record of a database;

generating contact updates based on the reliability of the stored contact information;

sending the generated contact updates to a plurality of client devices for updating contact information stored in the client devices; and generating contact revisions for updating contact information stored in at least one of the sources responsive to generating or updating one or more entries of the received contact information, wherein a contact revision generated based on contact information origination from a first source assigned with a first reliability is not sent to a second source assigned with a second reliability higher than the first reliability.

2. The method of claim 1, wherein generating the contact updates comprises generating a contact update for each of the users based on a privacy setting of the contact information, the privacy setting for contact information indicating client devices or users authorized to share the contact information.

3. The method of claim 1, wherein the received contact information comprises at least one of a phone number, a physical address, an email address, an instant messenger identity (ID) and a user ID for an Internet service.

4. The method of claim 1, further comprising:
determining whether the database has a record storing a same category of contact information for a user as the received contact information for the user; and
creating a record in the database for storing the received contact information responsive to determining that the database has no record storing the same category of contact information for the user.

5. The method of claim 4, further comprising performing deduplication of the contact information before determining whether the database has the record storing the same category of contact information.

6. The method of claim 1, wherein the database includes a plurality of tables for each user, each table storing one or more entries of contact information for a same category of contact information that is prioritized based at least on the reliability of the contact information.

7. The method of claim 6, wherein each of the plurality of tables includes access information for each entry of contact information, the access information indicating users or client devices authorized to access contact information in each entry.

8. The method of claim 1, wherein the reliability of the contact information is based further on at least one of (i) a number of the sources indicating a same contact information, and (ii) time at which the contact information was previously updated.

9. The method of claim 1, further comprising normalizing the received contact information for storing the contact information.

10. The method of claim 1, wherein the sources comprise at least one server for providing a social networking service and wherein the client devices comprise a mobile computing device.

11. The method of claim 10, wherein the reliability of the contact information is based further on relationships between a user of the contact information and users associated with the sources in the social networking service.

12. A computer-implemented method comprising:
receiving contact information for a plurality of users from a plurality of sources;
by a computing device, determining reliability of the received contact information based on sources of the received contact information, the reliability indicating likelihood that the received contact information is accurate;
storing the received contact information of each user in connection with a source of the received contact information in a record of a database;
indentifying the plurality of users of the received contact information by comparing data fields in the received contact information with data fields of records in the database, wherein a user of the received contact information is determined as a same user of contact information stored in a record of the database responsive to a number of matching fields in the received contact information and the stored contact information exceeding a threshold;
generating contact updates based on the reliability of the stored contact information; and
sending the generated contact updates to a plurality of client devices for updating contact information stored in the client devices.

13. A computing device comprising:
a processor;
communication module configured to receive contact information for a plurality of users from a plurality of sources;
a ranking module configured to determine reliability of the received contact information based on sources of the received contact information, the reliability indicating likelihood that the received contact information is accurate;
a database configured to store the received contact information of each user in connection with a source of the received contact information in a record;
a contact organizer configured to:
generate contact updates based on the reliability of the stored contact information,
generate contact revisions for updating contact information stored in at least one of the sources responsive to generation or updating one or more entries of the received contact information, and
cause a contact revision generated based on contact information originating from a first source assigned with a first reliability not to be sent to a second source assigned with a second reliability higher than the first reliability; and
a transmitter configured to send the generated contact updates to a plurality of client devices for updating contact information stored in the client devices, the transmitter further configured to send the contact revisions to at least a subset of the plurality of sources.

14. The computing device of claim 13, wherein the contact organizer is further configured to generate a contact update for each of the users based on a privacy setting of the contact information, the privacy setting for contact information indicating client devices or users authorized to share the contact information.

15. The computing device of claim 13, wherein the contact information comprises at least one of a phone number, a physical address, an email address, an instant messenger identity (ID) and a user ID for an Internet service.

16. The computing device of claim 13, further comprising a deduplicator configured to:
   determine whether the database has a record storing a same category of contact information for a user as the received contact information for the user; and
   create a record in the database for storing the received contact information responsive to determining that the database has no record storing the same category of contact information for the user.

17. The computing device of claim 16, wherein the deduplicator is further configured to perform deduplication of the contact information before determining whether the database has the record storing the same category of contact information.

18. The computing device of claim 13, wherein the database includes a plurality of tables for each user, each table storing one or more entries of contact information for a same category of contact information that is prioritized based at least on the reliability of the contact information, and wherein each of the plurality of tables includes access information for each entry of contact information, the access information indicating users or client devices authorized to access contact information in each entry.

19. The computing device of claim 13, wherein the ranking module determines the reliability of the contact information based further on at least one of (i) a number of the sources indicating a same contact information, and (ii) time at which the contact information was previously updated.

20. The computing device of claim 13, further comprising a contact aggregator for normalizing the received contact information for sending to a deduplicator module.

21. The computing device of claim 13, further comprising a contact identifier configured to identify the user of the received contact information by comparing data fields in the received contact information with data fields of records in the database.

22. The computing device of claim 13, wherein the sources comprise at least one server for providing a social networking service; and wherein the reliability of the contact information is based further on relationships between a user of the contact information and users associated with the sources in the social networking service.

23. A non-transitory computer-readable storage medium storing instructions, the instructions when executed by a processor cause the processor to:
   receive contact information for a plurality of users from a plurality of sources;
   determine reliability of the received contact information based on sources of the received contact information, the reliability indicating likelihood that the received contact information is accurate;
   store the received contact information of each user in connection with a source of the received contact information in a record of a database;
   generate contact updates based on the reliability of the stored contact information;
   send the generated contact updates to a plurality of client devices for updating contact information stored in the client devices; and
   generate contact revisions for updating contact information stored in at least one of the sources responsive to generating or updating one or more entries of the received contact information, wherein a contact revision generated based on contact information originating from a first source assigned with a first reliability is not sent to a second source assigned with a second reliability higher than the first reliability.

24. A non-transitory computer-readable storage medium storing instructions, the instructions when executed by a processor cause the processor to:
   receive contact information for a plurality of users from a plurality of sources;
   determine reliability of the received contact information based on sources of the received contact information, the reliability indicating likelihood that the received contact information is accurate;
   store the received contact information of each user in connection with a source of the received contact information in a record of a database;
   identify the plurality of users of the received contact information by comparing data fields in the received contact information with data fields of records in the database, wherein a user of the received contact information is determined as a same user of contact information stored in a record of the database responsive to a number of matching fields in the received contact information and the stored contact information exceeding a threshold;
   generate contact updates based pm the reliability of the stored contact information; and
   send the generated contact updates to a plurality of client devices for updating contact information stored in the client devices.

* * * * *

UNITED STATES PATENT AND TRADEMARK OFFICE
CERTIFICATE OF CORRECTION

PATENT NO.        : 8,566,328 B2
APPLICATION NO.   : 12/975201
DATED             : October 22, 2013
INVENTOR(S)       : Erick Tseng and Luke Shepard Page 1 of 1

It is certified that error appears in the above-identified patent and that said Letters Patent is hereby corrected as shown below:

In the Claims

In claim 1 on column 13, line 16, after "contact information," replace --origination-- with "originating".
In claim 9 on column 13, line 57, between "information for storing the" and "contact," insert --received--.
In claim 13 on column 14, line 44, before "or updating one or more," replace --generation-- with "generating".
In claim 24 on column 16, line 41, after "contact updates based," replace --pm-- with "on".

Signed and Sealed this
Ninth Day of September, 2014

Michelle K. Lee
*Deputy Director of the United States Patent and Trademark Office*